(12) United States Patent
Yanakiev et al.

(10) Patent No.: US 9,051,866 B2
(45) Date of Patent: Jun. 9, 2015

(54) METHOD AND APPARATUS FOR MONITORING A PARTICULATE FILTER

(75) Inventors: Ognyan N. Yanakiev, Canton, MI (US); Igor Anilovich, Walled Lake, MI (US); Cristian Taibi, Turin (IT); Charles E. Solbrig, Ypsilanti, MI (US); Janean E. Kowalkowski, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 13/477,899

(22) Filed: May 22, 2012

(65) Prior Publication Data

US 2013/0312389 A1 Nov. 28, 2013

(51) Int. Cl.
| F01N 3/00 | (2006.01) |
| F01N 3/02 | (2006.01) |
| F01N 3/20 | (2006.01) |
| F01N 11/00 | (2006.01) |
| F01N 9/00 | (2006.01) |
| F02B 37/22 | (2006.01) |

(52) U.S. Cl.
CPC ............ F01N 11/00 (2013.01); *Y02T 10/47* (2013.01); *F01N 9/002* (2013.01); *F02B 37/22* (2013.01); *F01N 2550/04* (2013.01); *F01N 2560/025* (2013.01); *F01N 2560/05* (2013.01); *F01N 2560/14* (2013.01)

(58) Field of Classification Search
USPC .......................................... 60/277, 297, 311
See application file for complete search history.

(56) References Cited

U.S. PATENT DOCUMENTS

| 6,161,528 A | 12/2000 | Akao et al. |
| 6,601,387 B2 | 8/2003 | Zurawski et al. |
| 8,037,737 B2 | 10/2011 | Recouvreur et al. |
| 2002/0196153 A1 | 12/2002 | Kinugawa et al. |
| 2009/0301062 A1* | 12/2009 | Sumida et al. ................. 60/285 |
| 2010/0242441 A1* | 9/2010 | Kondo et al. ................... 60/277 |
| 2010/0242442 A1* | 9/2010 | Kondo et al. ................... 60/277 |
| 2010/0300071 A1 | 12/2010 | Post et al. |
| 2011/0047978 A1* | 3/2011 | Zawacki et al. ................ 60/277 |
| 2011/0061368 A1* | 3/2011 | Miyata et al. .................. 60/277 |
| 2011/0173955 A1 | 7/2011 | Sun |
| 2011/0314796 A1* | 12/2011 | Nakamura et al. ............. 60/276 |
| 2011/0314899 A1 | 12/2011 | DiMiro et al. |
| 2012/0011829 A1* | 1/2012 | Taibi et al. ...................... 60/274 |
| 2012/0031078 A1* | 2/2012 | Sakamoto et al. ............. 60/277 |
| 2012/0125081 A1* | 5/2012 | Yadav et al. ................. 73/23.33 |
| 2012/0180458 A1* | 7/2012 | Nishijima ....................... 60/277 |

FOREIGN PATENT DOCUMENTS

| DE | 102006029990 A1 | 1/2008 |
| JP | 2011-179467 A | 9/2011 |
| JP | 2012-062804 A | 3/2012 |

* cited by examiner

*Primary Examiner* — Audrey K Bradley
*Assistant Examiner* — Dapinder Singh

(57) ABSTRACT

An internal combustion engine includes a particulate filter that is configured to treat exhaust gas. A method for monitoring the particulate filter includes employing a soot sensor to monitor the exhaust gas downstream of the particulate filter. A fault is detected in the particulate filter when accumulated soot mass indicated by the soot sensor exceeds a soot mass threshold over a course of engine operation between a first regeneration event and a second regeneration event of the particulate filter. A control module associated with operation of the internal combustion engine is notified of the fault.

10 Claims, 3 Drawing Sheets

METHOD AND APPARATUS FOR MONITORING A PARTICULATE FILTER

TECHNICAL FIELD

This disclosure is related to internal combustion engines employing particulate filters.

BACKGROUND

The statements in this section merely provide background information related to the present disclosure. Accordingly, such statements are not intended to constitute an admission of prior art.

Known internal combustion engines may be configured to operate with compression-ignition (CI) combustion, and are often referred to as diesel engines. CI engines and other engines operating lean of stoichiometry generate soot or particulate matter during operation. Known CI engines employ exhaust aftertreatment systems that include particulate filter devices to remove particulate matter from the exhaust gas feedstream. Monitoring systems detect faults in on-vehicle emissions devices, including particulate filters.

SUMMARY

An internal combustion engine includes a particulate filter that is configured to treat exhaust gas. A method for monitoring the particulate filter includes employing a soot sensor to monitor the exhaust gas downstream of the particulate filter. A fault is detected in the particulate filter when accumulated soot mass indicated by the soot sensor exceeds a soot mass threshold over a course of engine operation between a first regeneration event and a second regeneration event of the particulate filter. A control module associated with operation of the internal combustion engine is notified of the fault.

BRIEF DESCRIPTION OF THE DRAWINGS

One or more embodiments will now be described, by way of example, with reference to the accompanying drawings, in which.

DETAILED DESCRIPTION

Figure 1:
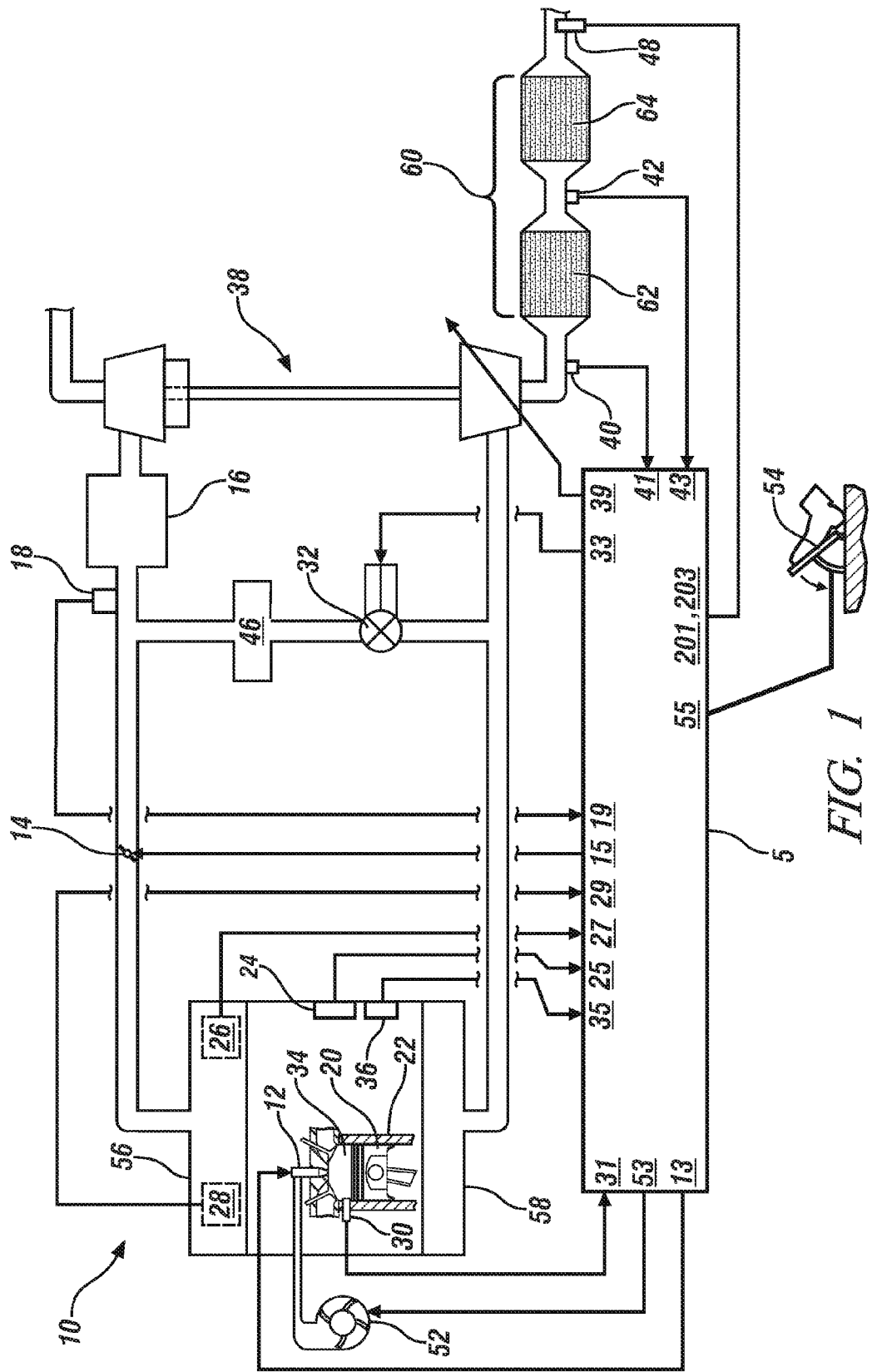
FIG. 1 illustrates an exemplary internal combustion engine, control module, and exhaust aftertreatment system, in accordance with the present disclosure.

Referring now to the drawings, wherein the showings are for the purpose of illustrating certain exemplary embodiments only and not for the purpose of limiting the same, FIG. 1 illustrates an exemplary internal combustion engine 10, control module 5, and exhaust aftertreatment system 60. The exemplary engine 10 includes a multi-cylinder, direct-injection, compression-ignition internal combustion engine including an intake manifold 56 and an exhaust manifold 58, and having reciprocating pistons 20 attached to a crankshaft and movable in cylinders 22 which define variable volume combustion chambers 34. The crankshaft may be attached to a vehicle transmission and driveline to deliver tractive torque thereto in response to an output torque request. The engine preferably employs a four-stroke operation wherein each engine combustion cycle includes 720° of angular rotation of crankshaft divided into four 180° stages of reciprocating movement of the piston 20 in the engine cylinder 22. Each variable volume combustion chamber 34 is defined between the piston 20, the cylinder 22, and a cylinder head as the piston 20 translates in the cylinder 22 between top-dead-center and bottom-dead-center points. The cylinder head includes intake valves and exhaust valves. The engine 10 preferably operates in a four-stroke combustion cycle that includes intake, compression, expansion, and exhaust strokes. It is appreciated that the concepts described herein apply to other combustion cycles. The engine 10 preferably operates at a lean air/fuel ratio. The exhaust aftertreatment system 60 fluidly couples to the exhaust manifold 58. The disclosure is applicable to other engine configurations that operate lean of stoichiometry and thus emit particulate matter. The disclosure is applicable to powertrain systems that employ internal combustion engines in combination with transmission devices to generate tractive torque, including by way of example engine-transmission systems and hybrid powertrain systems employing non-combustion torque generative motors.

The engine 10 includes sensors to monitor engine operation, and actuators that control engine operation. The sensors and actuators are signally and operatively connected to control module 5. The actuators are installed on the engine and controlled by the control module 5 in response to operator inputs to achieve various performance goals. A fuel injection system including a plurality of direct-injection fuel injectors 12 is fluidly coupled either directly or via a common-rail fuel distribution system to a pressurized fuel distribution system including a high-pressure fuel pump 52. The fuel pump 52 may be controlled to control fuel pressure 53. The fuel injectors 12 directly inject fuel into each of the combustion chambers 34 to form a cylinder charge in response to an injector control signal 13 from the control module 5. The fuel injectors 12 are individually supplied with pressurized fuel, and have operating parameters including a minimum pulsewidth and an associated minimum controllable fuel flow rate, and a maximum fuel flow rate. An exhaust gas recirculation (EGR) system includes a flow channel for directing flow of externally recirculated exhaust gas (EGR gas) between the exhaust manifold 58 and the intake manifold 56, an EGR valve 32 that is controlled via control signal 33 from the control module 5, and an EGR intercooler 46.

In one embodiment, an intake air compressor system 38 is configured to control flow of intake air to the engine 10 in response to a compressor boost command 39, and may be a variable-geometry turbocharger (VGT) system that includes a turbine device located in the exhaust gas stream rotatably coupled to a compressor device that is configured to increase flow of engine intake air. An air intercooler device 16 may be fluidly located between the intake air compressor 38 and the engine intake manifold 56. An electronically-controlled throttle valve 14 controls throttle opening and thus flow of intake air into the intake system of the engine in response to a throttle control signal (ETC) 15. A glow-plug may be installed in each of the combustion chambers 34 for increasing in-cylinder temperature during engine starting events at cold ambient temperatures. The engine 10 may be equipped with a controllable valvetrain configured to adjust openings and closings of intake and exhaust valves of each of the cylinders, including any one or more of valve timing, phasing (i.e., timing relative to crank angle and piston position), and magnitude of lift of valve openings.

Other sensors described herein are configured to monitor physical characteristics and generate signals that correlate to engine, exhaust gas, and ambient parameters. A crank sensor 24 interacts with a multi-tooth target wheel attached to the crankshaft to monitor engine crank position and engine speed (RPM) 25. A combustion pressure sensor 30 is configured to monitor cylinder pressure 31, from which a mean-effective pressure or another suitable combustion parameter may be determined. A mass air flow (MAF) sensor 18 monitors mass air flow 19 of fresh intake air. A coolant sensor 36 monitors engine coolant temperature 35. A manifold absolute pressure (MAP) sensor 26 monitors intake manifold absolute pressure 27 and ambient barometric pressure. A manifold air temperature (MAT) sensor 28 monitors intake manifold air temperature 29. Other sensors and monitoring schemes may be employed for purposes of control and diagnostics. Operator input in the form of an output torque request 55 may be obtained through an operator interface system 54 that preferably includes an accelerator pedal and a brake pedal, among other devices. Each of the aforementioned sensors is signally connected to the control module 5 to provide signal information which is transformed to information representative of the respective monitored parameter. It is understood that this configuration is illustrative, not restrictive, including the various sensors being replaceable with functionally equivalent devices and algorithms.

The exhaust aftertreatment system 60 includes a particulate filter 64 and other suitable devices, sensors, and injectors for oxidizing, reducing, trapping, and otherwise managing the exhaust gas feedstream, generally shown as device 62 with exhaust gas sensors 40 and 42. Exhaust gas sensors 40 and 42 monitor states 41 and 43 respectively, of one or more exhaust gas parameters, e.g., air/fuel ratio, and exhaust gas constituents, and may be used as feedback for control and diagnostics. The particulate filter 64 is shown at a distal end of the exhaust aftertreatment system 60 relative to the exhaust manifold 58, but it is appreciated that the particulate filter 64 may be situated in any suitable location within the exhaust aftertreatment system 60, including proximal to the exhaust manifold 58, or in a middle portion of the exhaust aftertreatment system 60. A soot sensor 48 is configured to monitor soot in the exhaust gas feedstream at an outlet end of the particulate filter 64. Preferably, the exhaust gas sensor 42 upstream of the particulate filter 64 and the soot sensor 48 are configured to monitor temperatures of the exhaust gas feedstream at those locations. A signal output of the soot sensor 48 may be used to determine efficacy of the particulate filter 64 with an intent to identify a change in emissions performance of the particulate filter 64 that indicates a potential fault. The soot sensor 48 generates a soot signal 201 and a sensor state 203. The soot signal 201 preferably includes a signal that varies in relation to magnitude of particulate matter in the exhaust gas feedstream (in μamps), and the sensor state 203 includes a sensor regeneration status flag (0 or 1), a sensor active flag (0 or 1) and a sensor self-diagnostic flag (0 or 1), all of which are used to indicate whether the soot signal 201 is valid and thus useable for monitoring the particulate filter 64. When the sensor state 203 is valid, it indicates that the soot sensor 48 is actively monitoring soot output from the particulate filter 48, and that the soot signal is valid and useable.

The control module 5 executes routines stored therein to control the aforementioned actuators to control engine operation, including throttle position, fuel injection mass and timing, EGR valve position to control flow of recirculated exhaust gases, compressor boost, glow-plug operation, and control of intake and/or exhaust valve timing, phasing, and lift on systems so equipped. The control module 5 is configured to receive the operator inputs (e.g., a throttle pedal position and a brake pedal position) to determine the output torque request 55 and receive signal inputs from the sensors indicating engine operation and ambient conditions. The engine 10 is configured to generate output torque in response to the output torque request 55, including operating over a broad range of temperatures, cylinder charge (air, fuel, and EGR) and injection events. The methods described herein are particularly suited to application on engines operating lean of stoichiometry.

Control module, module, control, controller, control unit, processor and similar terms mean any suitable one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other suitable components to provide the described functionality. Software, firmware, programs, instructions, routines, code, algorithms and similar terms mean any controller executable instruction sets including calibrations and look-up tables. The control module 5 has a set of control routines executed to provide the desired functions. The routines are preferably executed during preset loop cycles. Routines are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, routines may be executed in response to occurrence of an event.

Figure 2:
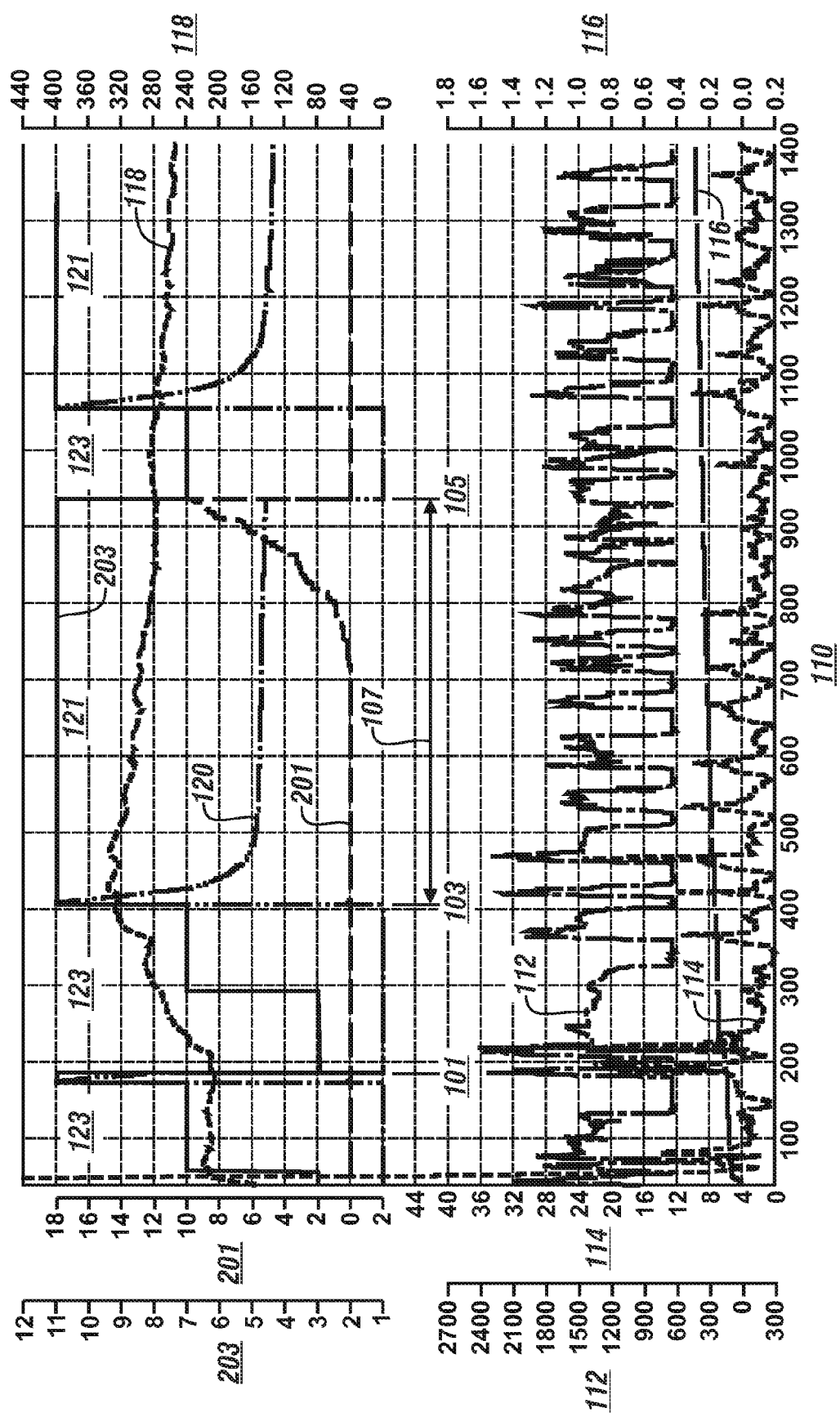
FIG. 2 illustrates a plurality of signals associated with operation of an embodiment of the soot sensor employed on an exemplary embodiment of the internal combustion engine in relation to elapsed time, in accordance with the disclosure.

FIG. 2 graphically shows a plurality of signals associated with operation of soot sensor 48 employed on internal combustion engine 10 during ongoing operation in relation to time 110, which is shown on the x-axis. Indicated time points include 101, 103, and 105. The signals include engine speed 112, estimated engine soot generation 114, integrated soot generation 116, and exhaust system temperature 118 and soot sensor temperature 120, which are shown on various y-axes. Sensor signals include the sensor state 203 and the soot signal 201. The soot signal 201 of the soot sensor 48 preferably includes a signal that indicates particulate matter in the exhaust gas feedstream (in μamps). The sensor state 203 indicates whether the soot signal 201 is valid or invalid, and includes information related to the sensor regeneration status flag, the sensor active flag and the sensor self-diagnostic flag. The exemplary soot sensor 48 is able to monitor soot in the exhaust gas feedstream under specific conditions. Thus for the soot signal 201 to be considered valid, the soot sensor 48 must be in a warmed-up condition, must not be in a sensor regeneration mode, must not be in a sensor diagnostic mode, and must not have any identified faults.

As shown, the sensor state 203 is "low" during a period between time points 101 and 103 indicating that the soot signal 201 is invalid. Activities such as sensor warm-up and/or sensor regeneration are occurring during that time period. During the period between time points 101 and 103, the soot sensor 48 is not actively monitoring soot in the exhaust gas feedstream, although engine operating conditions may be monitored employing another method to facilitate soot estimation during that period. The sensor state 203 changes to "high" or valid at time point 103, and monitoring of an elapsed time is initiated. The sensor state 203 remains valid until the soot signal 201 of the soot sensor 48 saturates, which is shown at time point 105, at which time the sensor state 203 becomes invalid, indicating that the soot signal 201 is invalid. Regeneration of the soot sensor 48 is then initiated in response to saturating the soot sensor 48. The elapsed time 107 between time points 103 and 105 is captured, and represents the elapsed time from start of soot monitoring by the soot sensor 48 until initiation of sensor regeneration (sec), which may be caused in response to saturating the soot sensor 48 or in response to another condition, e.g., entering into an engine-idle operating mode.

Figure 3:
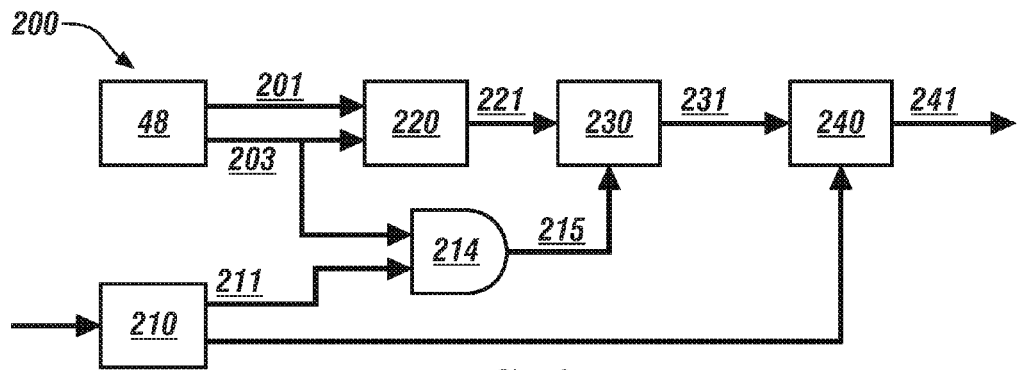
FIG. 3 illustrates a control scheme for monitoring efficacy of a particulate filter using a soot sensor, in accordance with the disclosure.

FIG. 3 schematically shows a control scheme 200 for monitoring efficacy of a particulate filter using a soot sensor, and is described with reference to the exemplary internal combustion engine 10, control module 5, and exhaust aftertreatment system 60 including the particulate filter 64 and soot sensor 48. The soot sensor 48 monitors the exhaust gas feedstream out of the particulate filter 64 to monitor efficacy of the particulate filter 64. Overall, the control scheme 200 employs the soot sensor 48 to detect a potential fault in the particulate filter 64 when an accumulated soot mass indicated by the soot mass sensor exceeds a predetermined soot mass threshold over a course of engine operation between a first particulate filter regeneration event and a second particulate filter regeneration event.

The soot signal 201 of the soot sensor 48 preferably includes signal elements that include a signal that varies in relation to particulate matter in the exhaust gas feedstream (in µamps). The sensor state 203 indicates validity of the soot signal 201, and preferably includes a sensor active flag (0 or 1), a sensor regeneration status flag (0 or 1), and a sensor self-diagnostic flag (0 or 1), as previously described. The soot signal 201 is considered valid and readable only when the sensor state 203 indicates the soot sensor 48 is warmed up, active, and not saturated, the sensor regeneration status flag indicates the sensor is not undergoing a regeneration event, and the sensor self-diagnostic flag indicates that the soot sensor 48 is not engaged in a self-diagnostic mode and has not detected a fault therein.

The soot signal 201 of the soot sensor 48 is preferably provided as input to a soot mass calculator 220. The soot mass calculator 220 calculates an amount of soot that accumulates when the soot signal 201 is indicated as being valid by the sensor state 203. The amount of soot may be measured in terms of a total mass, a total mass in relation to distance travelled, a total mass in relation to hours of operation, or another suitable metric. In one embodiment, the soot mass calculator 220 determines a soot mass 221 in accordance with the following relationship:

$$\Delta m = k^*(1/t_{rc})$$ [1]

wherein $\Delta m$ is the soot mass (g) 221;

$t_{rc}$ is the elapsed time from start of soot monitoring until a start of sensor regeneration (sec); and k is a predetermined calibration value (g-sec).

The soot mass calculator 220 monitors active periods of sensor operation to determine successive elapsed times between an end of a regeneration event for the soot sensor and a time point at which the signal output from the soot sensor subsequently saturates for successive active periods of sensor operation, and iteratively calculates the soot mass 221.

DPF entry conditions 210 include engine operating conditions that must be met to permit operation of the particulate filter monitor. Exemplary particulate filter monitoring entry conditions include an engine operating mode, particulate filter operating temperature, exhaust volumetric flowrate, elapsed time and distance since a prior particulate filter regeneration event, engine speed and engine fuel flow, particulate filter outlet temperature, and diagnostic state. The intent of monitoring and meeting the entry conditions for particulate filter monitoring is to be able to reliably determine when the engine is active, is operating within known and expected parameters, and is not regenerating the particulate filter 64. The output of the DPF entry conditions is an engine active signal 211.

A logic gate 214 monitors the sensor state 203 and the engine active signal 211, and generates a soot mass-integration signal 215 in response. When the sensor state 203 indicates the soot signal 201 is valid and the engine active signal 211 indicates the engine is operating within expected parameters, the soot mass-integration signal 215 permits a mass accumulator 230 to integrate the soot mass 221 to determine an accumulated soot mass 231.

Preferably the mass accumulator 230 integrates the iteratively calculated soot masses 221 over a period of time starting with an end of a particulate filter regeneration event to determine the accumulated soot mass 231. The mass accumulator 230 discontinues determining the accumulated soot mass 231 when a subsequent particulate filter regeneration event is initiated or a fault is indicated by a particulate filter diagnostic 240.

The accumulated soot mass 231 is monitored by the particulate filter diagnostic 240, which generates a diagnostic signal 241. When the accumulated soot mass 231 is greater than a predetermined threshold and a subsequent particulate filter regeneration event has not been initiated, a fault is indicated by the diagnostic signal 241. The fault indicates that soot output from the particulate filter 64 is greater than a predetermined soot output. Otherwise, no diagnostic fault is indicated. When a fault is indicated by the diagnostic signal 241, the control scheme 200 notifies the control module 5 of the fault, which undertakes appropriate action in response thereto. Such appropriate action may include recording the fault, capturing operating conditions associated with the fault, executing statistical analysis of the fault, executing remedial action such as undertaking regeneration of the particulate filter 64 and/or the sensor 48, and notifying the operator of the presence of the fault via a malfunction indicator lamp or other suitable methods. The operator may take appropriate action in response, including scheduling vehicle repair.

Figure 4:
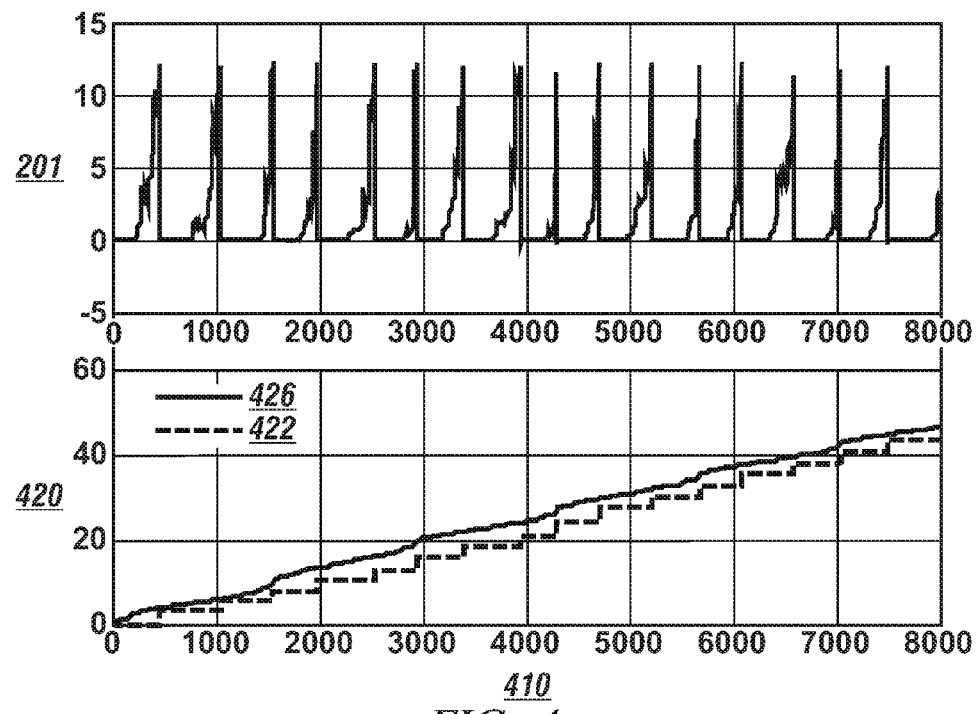
FIG. 4 illustrates a soot signal and corresponding accumulated soot generation for an exemplary engine operating over a known test cycle with an exemplary particulate filter that has a fault, in accordance with the disclosure.

FIG. 4 shows a soot signal 201 and a corresponding accumulated soot generation (mg) 420 in relation to elapsed time 410 for an exemplary engine operating over a known test cycle with an exemplary particulate filter that has a fault. An estimated accumulated soot mass 422 corresponding to the soot signal 201 is shown in relation to a laboratory-measured accumulated soot mass 426. As indicated, the estimated accumulated soot mass 422 closely follows and corresponds to the measured accumulated soot mass 426.

Figure 5:
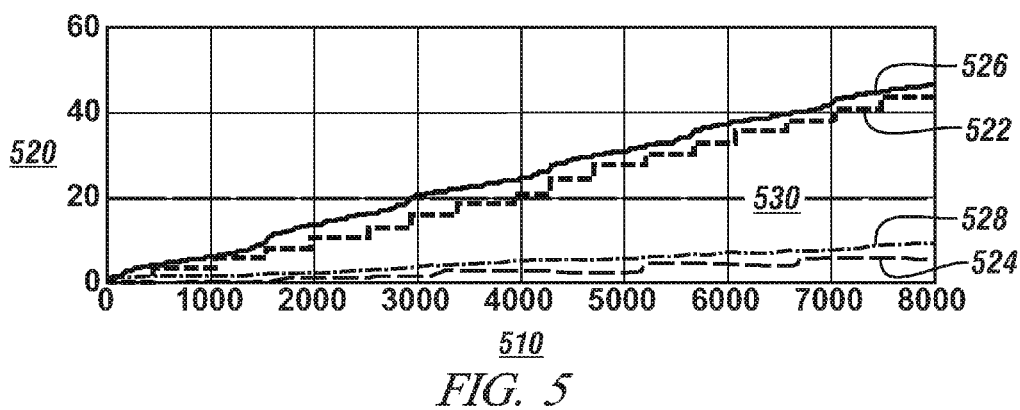
FIG. 5 illustrates accumulated soot generation for an exemplary engine operating over a known test cycle for a particulate filter that is functioning within allowable limits for soot generation and for a particulate filter that is functioning outside the allowable limits for soot generation, in accordance with the disclosure.

FIG. 5 shows an accumulated soot generation (mg) 520 in relation to elapsed time 510 for an exemplary engine operating over a known test cycle. A threshold accumulated soot mass (mg) 530 is shown. Depicted data includes an estimated accumulated soot mass 524 corresponding to the signal output 201 from the soot sensor 48 shown with a laboratory-measured accumulated soot mass 528 for a particulate filter that is functioning within allowable limits for soot generation. Depicted data also includes an estimated accumulated soot mass 522 corresponding to the signal output 201 from the soot sensor 48 shown with a laboratory-measured accumulated soot mass 526 for a particulate filter that is functioning outside the allowable limits for soot generation. The depicted data indicates that the estimated accumulated soot mass 522 corresponding to the signal output 201 from the soot sensor 48 may be used to monitor soot generation of a particulate filter.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for monitoring a particulate filter configured to treat exhaust gas from an internal combustion engine, comprising:
   employing a soot sensor to monitor the exhaust gas downstream of the particulate filter, comprising, by a particulate filter diagnostic, monitoring a soot signal output from the soot sensor beginning at the completion of a first regeneration event, iteratively determining a soot mass based upon the soot signal, and integrating the iteratively determined soot masses to determine an accumulated soot mass since the completion of the first regeneration event;
   detecting a fault in the particulate filter, by the particulate filter diagnostic, when the accumulated soot mass exceeds a soot mass threshold over a course of engine operation between the first regeneration event and a second regeneration event of the particulate filter;
   notifying a control module associated with operation of the internal combustion engine of the fault; and
   executing remedial action in response to the fault, including operating the particulate filter and soot sensor in a regeneration mode.

2. The method of claim 1, wherein monitoring the soot signal output from the soot sensor comprises
   measuring the time between an end of a regeneration event for the soot sensor and a time at which the soot signal output from the soot sensor subsequently saturates.

3. The method of claim 1, wherein determining the soot mass based upon the soot signal includes determining soot mass in accordance with the following relationship:

$$\Delta m = k^*(1/t_{rc})$$

wherein
   $\Delta m$ is the soot mass;
   $t_{rc}$ is an elapsed time from start of soot monitoring until a start of sensor regeneration; and
   k is a predetermined calibration value.

4. The method of claim 1, wherein monitoring the soot signal output from the soot sensor comprises monitoring the elapsed time between successive regeneration events for the soot sensor.

5. The method of claim 1, wherein employing the soot sensor to monitor the exhaust gas downstream of the particulate filter further comprises:
   monitoring the soot signal output from the soot sensor to determine an elapsed time between an end of a regeneration event for the soot sensor and a time at which the soot sensor subsequently saturates for successive active periods of sensor operation;
   iteratively determining soot mass in the exhaust gas for each of the successive active periods of sensor operation based upon the soot signal; and
   integrating the iteratively determined soot masses in the exhaust gas for the successive active periods of sensor operation to determine the accumulated soot mass.

6. Method for monitoring a particulate filter configured to treat exhaust gas from an internal combustion engine, comprising:
   detecting a fault in the particulate filter, by a particulate filter diagnostic, when an accumulated soot mass since the completion of a first regeneration event exceeds a soot mass threshold, said accumulated soot mass determined based upon a soot signal from a soot sensor configured to monitor the exhaust gas downstream of the particulate filter beginning at the completion of the first regeneration event and continuing during periods of time when a sensor state of the soot sensor indicates said signal output is valid and when an engine state indicates the engine is not regenerating the particulate filter; and
   notifying a control module associated with operation of the internal combustion engine of the fault; and
   executing remedial action in response to the fault, including operating the particulate filter and soot sensor in a regeneration mode;
   wherein determining said accumulated soot mass based upon the soot signal output from the soot sensor comprises:
      monitoring elapsed times during which the soot sensor is actively monitoring soot downstream of the particulate filter;
      iteratively determining soot masses based upon the elapsed times; and
      integrating the iteratively determined soot masses to determine the soot mass that has accumulated since the completion of the first regeneration event and while the sensor state indicates the signal output is valid.

7. The method of claim 6, wherein determining the soot masses based upon said elapsed times includes determining each soot mass in accordance with the following relationship:

$$\Delta m = k^*(1/t_{rc})$$

wherein
   $\Delta m$ is the soot mass;
   $t_{rc}$ is an elapsed time from start of soot monitoring until a start of sensor regeneration; and
   k is a predetermined calibration value.

8. The method of claim 6, wherein monitoring the elapsed times during which the soot sensor is actively monitoring soot downstream of the particulate filter comprises:
   monitoring a signal output from the soot sensor; and
   measuring the time between an end of a regeneration event for the soot sensor and a time at which the signal output from the soot sensor subsequently saturates.

9. The method of claim 6, wherein monitoring the elapsed time during which the soot sensor is actively monitoring soot downstream of the particulate filter comprises monitoring the elapsed time between successive regeneration events for the soot sensor.

10. The method of claim 6, wherein determining said accumulated soot mass based upon the soot signal output from the soot sensor further comprises:

monitoring elapsed times during which the soot sensor is actively monitoring soot downstream of the particulate filter for successive active periods of soot sensor operation;

iteratively determining soot masses based upon the elapsed times for the successive active periods of soot sensor operation; and integrating the iteratively determined soot masses for the successive active periods of soot sensor operation to determine the accumulated soot mass.

* * * * *